United States Patent
Hayasaka

[15] 3,668,447
[45] June 6, 1972

[54] HOMOPOLE-TYPE AC GENERATOR

[72] Inventor: Enakichi Hayasaka, No. 322, Nakazato-cho, Kito-ku, Tokyo, Japan

[22] Filed: May 27, 1968

[21] Appl. No.: 740,390

[30] Foreign Application Priority Data

May 29, 1967 Japan..................................42/33690

[52] U.S. Cl. ............................................................310/166
[51] Int. Cl. .........................................................H02k 17/00
[58] Field of Search..................310/178, 156, 152, 159, 161, 310/166, 168, 171, 174, 261, 264, 265, 266

[56] References Cited

UNITED STATES PATENTS

| | | | |
|---|---|---|---|
| 2,206,920 | 7/1940 | Riggs | 310/161 |
| 2,889,475 | 6/1959 | Emerson | 310/266 |
| 3,154,707 | 10/1964 | Bright | 310/261 |
| 3,444,405 | 5/1969 | Ellis | 310/261 |
| 3,320,449 | 5/1967 | Delaloye | 310/156 |
| 3,428,837 | 2/1969 | Morreale | 310/156 |
| 3,428,840 | 2/1969 | Kober | 310/156 |

OTHER PUBLICATIONS

Steinmetz Publication, TK 2181; Theory & Calculation of Electric Apparatus; 1-st Ed; 1917; McGraw-Hill Book Co., Inc.; New York, N.Y.

*Primary Examiner*—J. D. Miller
*Assistant Examiner*—R. Skudy
*Attorney*—Sparrow and Sparrow

[57] ABSTRACT

A homopole-type AC generator having a rotary magnetic pole body mounted on a rotary drive shaft such that the magnetic axis coincides with the axis of said drive shaft, a pole piece provided on the homopole of the N and S poles of said pole body, magnetic paths along which and through said pole piece the magnetic flux flows from one pole of said rotary magnetic pole body to the other pole, coils disposed in said magnetic paths so as to interlink said magnetic flux, whereby the rotation of said pole body generates AC voltage depending on engagement and disengagement operations between said magnetic flux and the magnetic circuit produced by said coils.

12 Claims, 15 Drawing Figures

INVENTOR
Enakichi Hayasaka

BY Sparrow and Sparrow
ATTORNEYS

FIG. 9.
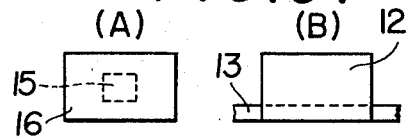
FIG. 10.
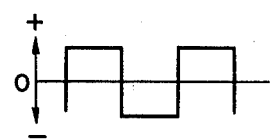
FIG. 11.
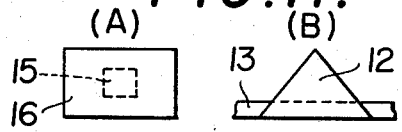
FIG. 12.
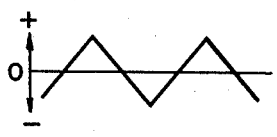
FIG. 13.
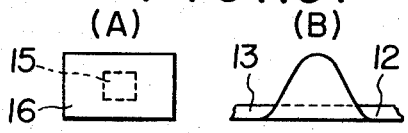
FIG. 14.
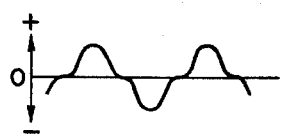
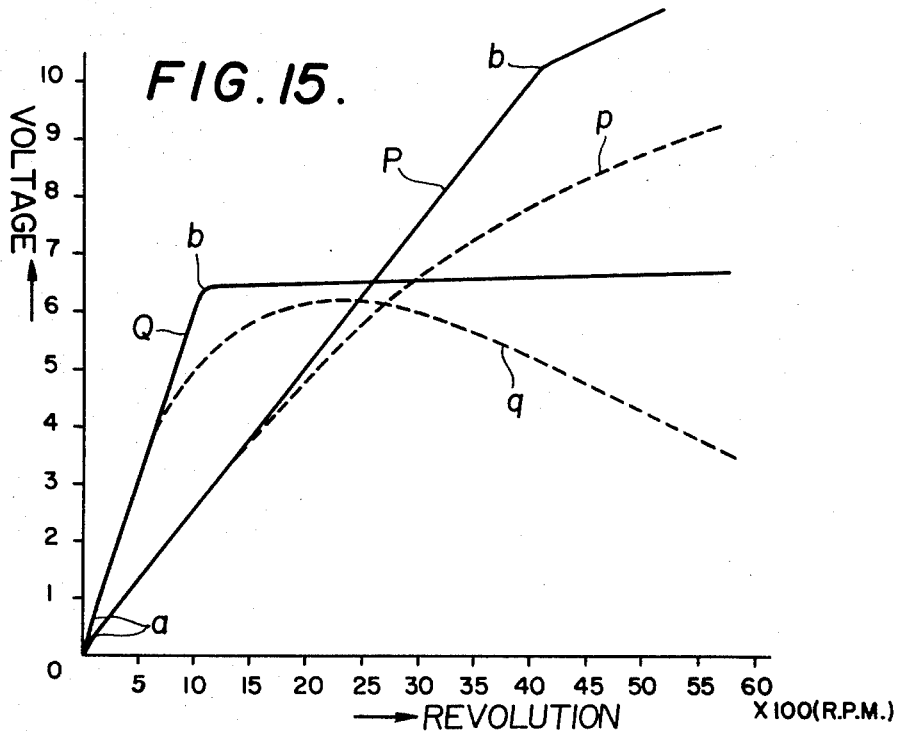
FIG. 15.
INVENTOR
Enakichi Hayasaka
BY Sparrow and Sparrow
ATTORNEYS 3,668,447

HOMOPOLE-TYPE AC GENERATOR

BACKGROUND OF THE INVENTION

1. Field of the Invention

The present invention relates to a homopole-type AC generator, and particularly to a generator which is of homopolar arrangement and is adapted to generate alternating current depending upon interlinkaging operations of magnetic fluxes.

2. Description of Prior Art

The principles of existing rotary type generators to convert rotational power into electrical power are classified as follows: There is a method wherein either magnetic fluxes fixed to a pole surface are rotated with the magnetic fluxes forming magnetic circuits or an armature is rotated to produce dynamic displacements between the conductor of the armature and magnetic fluxes for causing the conductor to successively cross the magnetic fluxes, whereby a voltage is generated according to Lenz effect. There is another method wherein the magnetizing force is mechanically increased and decreased so as to produce an interlinkage (or engagement) and dis-interlinkage (or dis-engagement) operation between coils in an armature and magnetic flux link, and the fluctuating magnetic fluxes due to said increase and decrease generate a voltage according to Lenz effect.

The first method is utilized for most existing rotary generators while the second one is applied only to a few special uses, for example, in an outburst type magnet generator for ignition or in a Edison high-frequency generator. For the convenience sake of description, the first method is hereunder termed "cross movement type generating method" and the second one is called "magnetism engagement and disengagement type generating method."

A different view point classifies the conventional generating types as follows: There is a multipolar type of generator which is of such arrangement that the magnetic axis of a magnetic pole is arranged radially with respect to the axis of a shaft which drives an armature. With a two-polar-type generator, for example, the arrangement is that different kinds of poles N and S are disposed in reversed relation by 180° to arrange the magnetic axis in a plane perpendicular to the axis of a drive shaft. There exists also a homopolar type of generator which is based on a principle that the movement of a wire in a direction across magnetic fluxes produces a uni-directional electromotive force thus to generate a direct current.

Combinations of the above-classified conventional methods and types are further classified into four types, namely, (a) multipolar—cross movement type (AC and DC), (b) multipolar—magnetism engagement type (AC), (c) multipolar—magnetism disengagement type (AC) and (d) homopolar—cross-movement type (DC).

A conventional cross-movement type generator has a defect in that the magnetic flux at the pole surface is biased toward one side of the pole surface by a reaction power from the current flowing through the coils and further in that the degree of the bias varies with the exciting force of the coil, with the result that no output of stabilized wave form is obtainable. Furthermore, a multipolar type generator is required to be provided with a substantial width of non-magnetic flux or neutral area between different kinds of poles as well as with similar spaces between armature core teeth. This reduces the effective angles rotated as compared with the corresponding driving angles which results in causing of hunting so that the waves are discontinuous. A consideration of the space factors of small diameter generators will make it apparent that this harmful effect remarkably accompanies such a generator.

Still further, conventional magnetism engagement type and magnetism disengagement type generators have the shortcoming that they inefficiently utilize only one of the engaging and disengaging operations between magnetic fluxes and that they require a large number of magnetic poles.

SUMMARY OF THE INVENTION

As it will be described later in detail, the generator of the present invention is of the homopole-type—magnetism engagement and disengagement type (AC) which does not belong to any of the existing types of generators.

The principle of the generating operation by the generator according to the present invention is summarized as follows:

The axis of the shaft for driving the generator is disposed as to coincide with the magnetic axis of the rotary magnetic pole body driven by the driving shaft. Armature cores are positioned within the range of the homopole of N and S poles of the magnetic pole. The magnetic flux passing through the armature cores are subjected to variation by the rotation of the magnetic pole and generate a current of a half cycle through a course wherein the magnetic fluxes are brought into "engagement" or interlinkage with coils of the armature cores. A current of a next half cycle is also generated through a subsequent course wherein the magnetic fluxes are "disengaged" from the armature core coils, or in other words, the magnetic fluxes are released from their interlinkages with the coils. Totally, in the above two half-cycles one cycle of alternating current is generated. A single rotary magnetic pole (rotor) and a single fixed armature part which conduct the mentioned operation may constitute a single element which is for a single phase and which may be divided into appropriate number of elements in the homopole for, say, two or three phase. Further, an appropriate selection of the magnetic pole of the rotor facing the armature will make it possible to obtain a voltage of a selected one of various wave forms such as rectangular form, triangular form etc.

The homopole-type type generator of the present invention is based on the magnetism engagement and disengagement principle. This prevents any irregularity from being produced by the reaction power from the current. Further, the generator according to the invention utilizes magnetic variations generated by both engaging and disengaging operation of a magnetic interlinkage for generating a power. This affords the generator a highly increased efficiency of generation. Furthermore, the movement of the magnetic engagement and disengagement operation continues in a remarkably stabilized condition since no constant is given when the reaction power controls the velocity of the movement.

It is a primary object of the present invention to provide an entirely novel and useful homopole-type AC generator which depends only on a homopole to generate an alternating current.

A further object of the invention is to provide an AC generator which utilizes both engaging and disengaging operations in a magnetic linkage.

A further object of the invention is to provide an AC generator which is able to generate an alternating current of a desired wave form such as rectangular or triangular one.

A further object of the invention is to provide an AC generator which has a revolution vs. generated voltage characteristic of an enlarged linear range.

A still further object of the invention is to provide an AC generator whose revolution vs. generated voltage characteristic has a linear portion up to the extent of the revolution and whose generated output remains substantially constant regardless of a further increase of the revolution beyond said extent.

Other object and features of the present invention will be made apparent from the following description in conjunction with the accompanying drawings in which:

FIG. 1 is a side view of an embodiment of the single phase, single element and single pole AC generator according to the present invention with a part thereof being shown in longitudinal section, FIG. 2 is a cross-sectional front view taken along line 2—2 in FIG. 1, FIG. 3 is a side view of an embodiment of the single phase, single element and two pole AC generator according to the present invention with a part thereof being shown in longitudinal section, FIG. 4 is a cross-sectional front view taken along line 4—4 in FIG. 3, FIG. 5 is a side view of an embodiment of the three phase, single element and single pole AC generator according to the present invention with a part thereof being shown in longitudinal section, FIG. 6 is a cross-sectional front view taken along line 6—6 in FIG. 5, FIG. 7 is a side view of an embodiment of the single phase, two element and single pole AC generator according to the present invention with a part thereof being shown in longitudinal section, FIG. 8 is a cross-sectional front view taken along line 8—8 in FIG. 7, FIG. 9(A) is a developed plan view of an embodiment of the yoke piece according to the invention, FIG. 9(B) is a developed plan view of an embodiment of the pole piece according to the invention, FIG. 10 diagrammatically illustrates a wave form of the voltage generated where the yoke piece and the pole piece shown in FIGS. 9(A) and 9(B) are utilized, FIG. 11(A) is a developed plan view of a further embodiment of the yoke piece, FIG. 11(B) is a developed plan view of a further embodiment of the pole piece, FIG. 12 diagrammatically illustrates a wave form of the voltage generated where the yoke and pole pieces shown in FIGS. 11(A) and 11(B) are utilized, FIG. 13(A) is a developed plan view of a still further embodiment of the yoke piece, FIG. 13(B) is a developed plan view of a still further embodiment of the pole piece, FIG. 14 diagrammatically illustrates a wave form where the yoke and pole pieces shown in FIGS. 13(A) and 13 (B) are utilized, and FIG. 15 is a diagram wherein the characteristics of the AC generators of respective embodiments of the present invention and of a conventional AC generator are illustrated with respect of to their revolutions relative to the voltages generated.

DESCRIPTION OF PREFERRED EMBODIMENT

Figure 2:
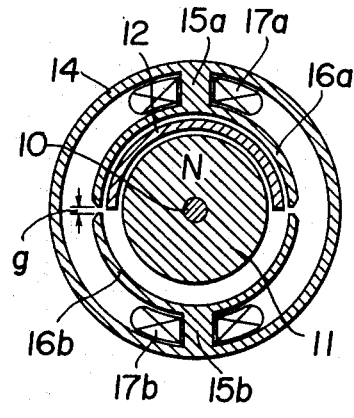
Figure 1:
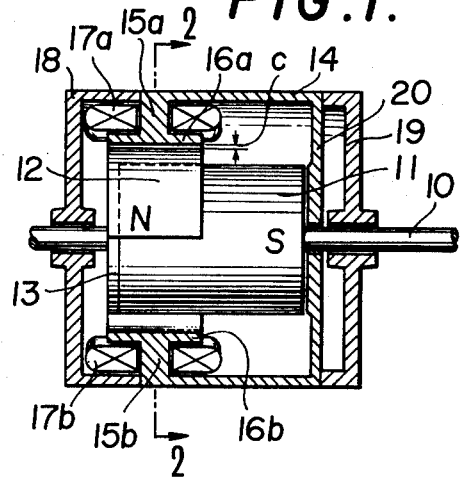

FIGS. 1 and 2 show an embodiment of the single phase, single element and single pole AC generator having a rotary drive shaft 10 to which is fixed a cylindrical rotary magnetic pole body 11 of a permanent magnet having at one end the N pole and at the other end the S pole. The arrangement is such that the magnetic axis of the magnetic pole body 11 coincides with the axis of the drive shaft 10. An electromagnet may be substituted for the permanent magnet 11. A semi-cylindrical pole piece 12 is secured to a pole cap 13 which in turn is mounted on the rotary magnet pole body 11 at one end, for example, the N pole end thereof. The pole piece 12 is of such width that extends within the N pole range, and is, in this embodiment, of a rectangular configuration when developed. An armature yoke 14 has a pair of fixed cores 15a and 15b disposed therein in diametrically opposed relationship. The cores 15a and 15b have respective core pieces 16a and 16b spaced by a gap g 1 from one another and also are provided with respective generating coils 17a and 17b wound therearound. The core pieces 16a and 16b have their inner surfaces disposed in the same circle and are spaced by a distance corresponding to a clearance c from the pole piece 12. The shaft 10 is supported by covers 18 and 19 which are made from a non-magnetic material such as aluminum for cooperating with the drive shaft 10 to minimize the leakage of the magnetic flux. Since there are generated in the coils 17a and 17b electromotive outputs having therebetween a phase difference of 180°, the coils are connected in the reversed direction of winding regardless of whether they are connected in series or in parallel.

In the position shown in FIGS. 1 and 2, the magnetic flux extends from the N pole of the rotary magnetic pole body 11 and through the pole piece 12, the clearance c, passing through the core piece 16, the core 15a and the yoke 14 and reaching a pole end plate 20 and thence to the S pole to form a magnetic circuit.

When the rotary magnetic pole body 11 and the pole piece 12 are rotated by the drive shaft 10 for 180 degrees from the position shown in FIGS. 1 and 2, the magnetic flux passes from the N pole and through the pole piece 12, the core piece 16b, the core 15b and reaches the S pole to form thereby a magnetic circuit. Therefore, when the magnetic flux enters into one of the core pieces (engagement of the megnetism with the magnetic circuit produced in this core piece by the corresponding generating coil) and leaves the other of the core pieces (disengagement of the magnetism from the magnetic circuit produced in said the other core piece by the corresponding generating coil) the magnetic circuits are switched over. Thus, a cycle of current has been generated by the engaging and disengaging operations between the magnetisms.

Figure 4:
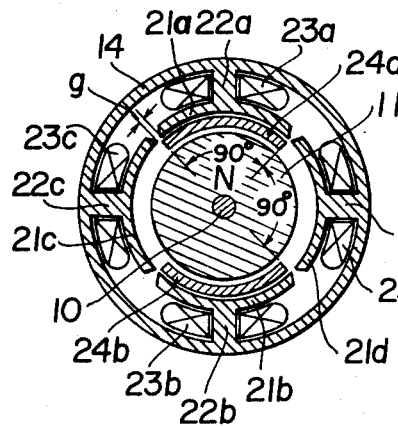
Figure 3:
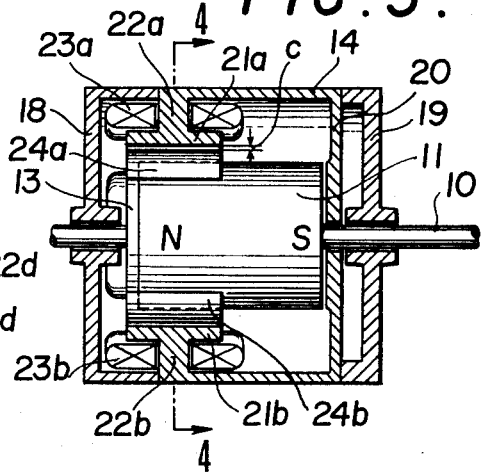

FIGS. 3 and 4 show an embodiment of the single phase, single element and two pole AC generator. Some of the parts of this embodiment are respectively identical with the corresponding parts of the motor shown in FIGS. 1 and 2 and are designated by the corresponding reference numerals. A description is, thus, omitted with respect to these parts of this embodiment. In the instant embodiment, four core pieces 21a, 21b, 21c and 21d are mounted on cores 22a, 22b, 22c and 22d, respectively, and the cores are fixed to the yoke 14 in the inside thereof, the core pieces being spaced by the gaps g from one another. Each of the cores 22a to 22d is wound with generating coils 23a, 23b, 23c or 23d. Pole pieces 24a and 24b are each of an arch form extending over 90° and are mounted by means of a pole cap 13 onto a rotary magnetic pole body 11 in diametrically opposed relationship. Thus, the generator of the instant embodiment generates two cycles of current for one revolution.

In the arrangement of this embodiment, the pole pieces 24a and 24b may be replaced with a single semi-cylindrical pole piece such as pole piece 12 shown in FIG. 1. This modification makes it possible that two-phase-type voltage is generated between an adjacent pair of coils, such as the pair of coils 23a and 23c or coils 23b and 23d. In this instance, the coils may be connected in series-parallel so that each pair of opposed coils is for one phase.

Figure 5:
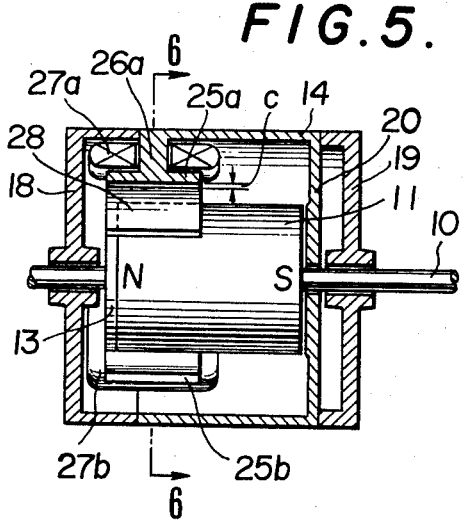
Figure 6:
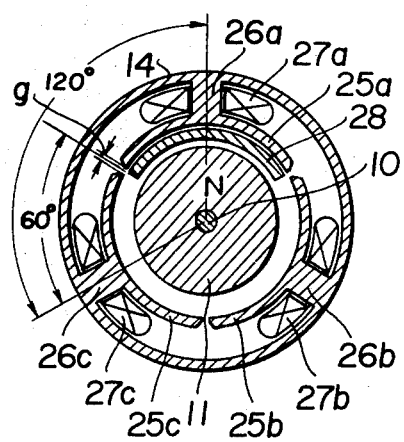

FIGS. 5 and 6 show an embodiment of the three phase, single element and single pole AC generator. Three core pieces 25a, 25b and 25c, each adjacent pair of the pieces being spaced by a gap g, are each provided on a corresponding one of cores 26a, 26b and 26c which in turn are fixed to a yoke 14 in the inside thereof. The cores 26a to 26c are wound with generating coils 27a, 27b and 27c, respectively. A pole piece 28 of an arc form extending over 120° is mounted by a pole cap 13 onto a rotary magnetic pole body 11. Each of the generating coils is for each one of the three phases and it is possible to form selectively a star connection or delta connection.

It is to be noted that the motor of the instant embodiment may be modified to have two-pole pieces as in the embodiment shown in FIG. 3 and have six yoke pieces so as to form a two-pole type generator.

Figure 7:
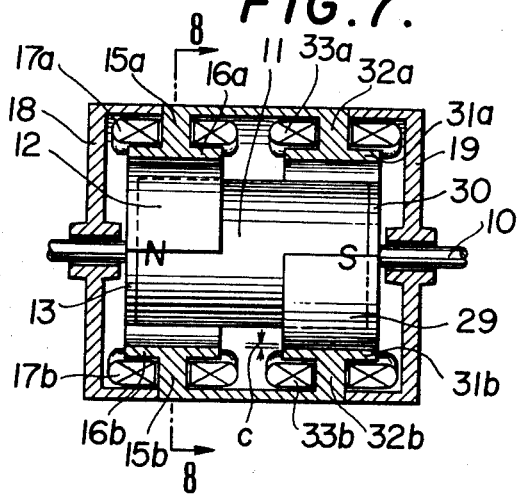
Figure 8:
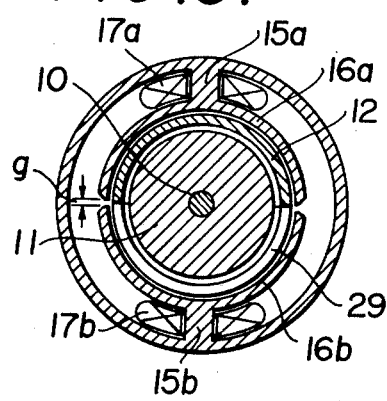

FIGS. 7 and 8 show an embodiment of a single phase, two-element and single pole AC generator. A semi-cylindrical pole piece 12 is mounted by a pole cap 13 onto a rotary magnetic pole body 11 at the N pole portion thereof while a semi-cylindrical pole piece 29 is mounted by a pole cap 30 onto pole piece 12 at the S pole portion in such manner that pole pieces 12 and 29 are in diametrically opposed relationship to one another. Within a yoke 14, are provided cores 15a, 15b, 32a and 32b. Each of the cores 15a and 15b has correspondingly one of core pieces 16a and 16b which are arranged in opposed relation to the pole piece 12. Similarly, each of the cores 32a and 32b has correspondingly one of core pieces 31a and 31b which are disposed in opposed relation to the pole piece 29. The cores 15a, 15b, 32a and 32b are wound with generating coils 17a, 17b, 33a and 33b, respectively. This arrangement makes it possible to utilize both of the N and S poles which results in an increase of space factor. Incidentally, the generator of the instant embodiment may also be modified into a two-phase type as has been described with respect to the modification of the embodiment shown in FIG. 3.

FIG. 9(A) shown in developed plan view the core piece 16 and the core 15. Similarly, FIG. 9(B) shows in developed plan view the pole piece 12. The pole piece 12 has rectangular configuration and this causes the generated voltage to have rectangular wave form as shown in FIG. 10.

FIG. 11(A) shows in developed plan view a modification of the core piece 16 and the core 15. Similarly, FIG. 11(B) shows in developed plan view a modification of the pole piece 12. The pole piece 12 has a triangular configuration resulting in that the generated voltage has triangular waveform as shown in FIG. 12.

FIG. 13(A) shows in developed plan view a further modification of the core piece 16 and the core 15. Similarly, FIG. 13(B) shows a further modification of the pole piece 12 in developed plan view. This pole piece has a configuration coinciding with a cycle part of sine wave extending between the two adjacent bottoms of the wave. FIG. 14 illustrates the wave form of the voltage generated by a generator utilizing the pole piece of the above-described form. Therefore, the wave of the voltage has a series of alternately arranged mounts and valleys each coinciding with the pole piece of the above-described configuration. The wave of this form may, therefore, be called "modified sine wave." The voltage generated in two phases, therefore, is available to be rectified into a complete direct current which is free from ripples. Not limiting the configuration of this pole piece to be a sine wave, the configuration may be a wave form that on the point of a half of wave height, the upper half wave form is symmetrical to the lower half one. The wave of this form may be called "upper and lower half symmetrical wave."

It will thus be apparent that, by appropriately selecting the configuration of the pole piece 12, it is possible to obtain a generated voltage of a desired form of wave such as rectangular wave, triangular wave or modified sine wave.

Now, a description of examples of uses of the generator according to the present invention will be made hereunder.

I. HOMOPOLE-TYPE AC GENERATOR FOR DETECTION OF NUMBERS OF REVOLUTION

Generally, a generator for detecting rotating velocity, such as a generator for a tachometer, is required to be of such a character as to generate a voltage which is exactly and linearly in proportion to the number of revolutions.

Since a permanent magnet, for example, Barium-ferrite permanent magnet, is not of ferromagnetic material, the magnetic material per se has an extremely reduced specific permeability while having a remarkably large magnetic potential as it is apparent from the fact that the magnetization of the material depends on a strong magnetic field. It is recognized that when the dimension of a gap positioned in a magnetic circuit magnetized by such magnet is varied within a limit, the density of the magnetic flux passing across said varied gap hardly varies whereas, if the gap is varied beyond said limit, the density of the magnetic flux decreases violently.

It is said that the larger the unit of magnetic energy integration of a permanent magnet is, the more superior the magnet is, said integration being the representative totally of the coercive force and the remanence of the magnet. It is, however, not understood as yet as to what kind of component the magnetic energy is which would compensate the increase of the reluctance resulting from the variation of the gap dimension. Accordingly, the energy functioning as such is hereunder termed as "latent magnetizing force" for convenience sake of description. The value of the latent magnetizing forces of various kinds of permanent magnets may be known by establishing magnetic circuits with variable gaps being provided therein, respectively, and by measuring the magnetic flux density at the gap for each magnet.

It is the first requirement of the instant example that a permanent magnet of large latent magnetizing power is used to form the rotary magnetic pole body of the homopole-type AC generator as described hereinabove in conjunction with the accompanying drawings.

A dimensional increase of a gap $c$ between a magnetic pole and an armature means a relative decrease of the above-mentioned latent magnetizing power. It is, therefore, the second requirement of the instant example that the gap is made as small as possible so as to obtain a relatively large magnetizing latent power in a static magnetic circuit.

When a generator is driven, the magnetism is shifted and there is produced a reversed magnetic field due to an eddy current in the armature core as well as a hysteresis loss. These magnetic losses progressively consume the latent magnetizing power in the magnetic pole as the rotational speed and the generated voltage increase. It is, therefore, the third requirement of the instant example to utilize as the magnetic pole a magnet of extremely small reversible permeability so as to prevent a production of reversed magnetic field. Incidentally, the second and the third requirements above mentioned are in complementary relationship to each other and, in this sense, both requirements may be regarded as one requirement.

It is mentioned that the above-mentioned features are attained with a Barium-ferrite magnet or a Manganese-ferrite magnet etc.

It is the fourth requirement of the instant example to select a generator whose core is of reduced hysteresis loss.

The full line P in FIG. 15 represents, as an example, the characteristic of the homopole-type AC tachogenerator of the present invention which has been made to satisfy the first to fourth requirements above mentioned, said characteristic being with respect to the number of revolution of the generator relative to the voltage generated thereby. It will be apparent from the figure that the part of the line P between alteration points $a$ and $b$ thereon is completely linear. The dashed line $p$ in this figure represents the character of a conventional tacho-generator. For example, in the case where the gap $c$ is of 0.5 mm, the points $a$ and $b$ are positioned at 300 rpm and 1,500 rpm, respectively, whereas, where the clearance $c$ is 0.15 mm, the points $a$ and $b$ are positioned at 30 rpm and 4,950 rpm, respectively. While the above requirements are applicable to conventional multipolar-cross movement type generators, remarkably increased advantages can be obtained when the requirements are applied to the homopole-type AC generator of the present invention.

II. POWER SOURCE GENERATOR FOR USE WITH VARIABLE SPEED ENGINE

A power source generator which receives its generative power from an internal combustion engine is driven at variable speed, such as in a vehicle. It is, therefore, required that a generator operated in such way generates a constantly stabilized voltage.

A conventional electrical power source generator utilizes a regulator for regulating the exciting force of an electromagnetic pole. This type of generator has many attachments and suffers essentially form frequent drawbacks due to its complicated mechanism. Generally, the generator of this class generates three phase alternating current for obtaining an increased rectification efficiency in the rectification and the generated AC current is subjected to parallel rectification which is carried out with six commutators. With this system, however, there is produced a ripple voltage of the order of 30 percent and a loss of about 40 percent of the generated voltage resulting in a poor rate of use.

Next, a description is made with respect to the problems accompanied by charging a power source generator which problems are usually overlooked. Assuming that $E_1$ denotes the generated voltage, $E_2$ battery voltage, $I$ charging current, $R_1$ the internal resistance of the generator and $R_2$ the internal resistance of the battery, the current $I$ of this electrical circuit is represented by the following formula:

$$I = (E_1 - E_2)/R_1 + R_2)$$

That is to say, $(E_1 - E_2)$ is a voltage which is not detected at the terminals. Usually, however, $E_2 = E_2$ is regarded as the terminal voltage and the apparent output $W_2$ of the generator is regarded as being equal to $E_2I$, that is, $W_2 = E_2I$. Assuming that $W_o$ designates the apparent generator power and $W_1$ indicates the apparent internal loss of the generator, $W_o = W_1 + W_2 = I^2R_1 + I^2R_2$ to give $W_o = (E_1 - E_2)I$. Thus, the apparent efficiency $e_o$ is represented as follow: $e_o = E_2I/E_1I$. Therefore, the effective efficiency $e$ equals to $R_2/(R_1 + R_2)$. It is, accordingly, liable to be overlooked that substantial parts of usually so-called output power of generator is an internal loss of the generator as far as a generator for charging is concerned.

A multipolar three phase generator has the winding having turns bridged over different kinds of poles resulting in longer distance of winding. Thus, it is extremely difficult for this system to have the arrangement whereby $R_1$ is greater than $R_2$ and, accordingly, it is the existent and actual state that the value of $e$ is less than 10 percent.

A description is made hereunder with respect to the requirements for the generator of the instant embodiment of this invention. For the rotary magnetic pole body 11 a permanent magnet of predetermined latent magnetizing force and of decreased reversible permeability is utilized. The armature core is formed from a material of such nature that the hysteresis magnetic loss varies in reverse proportion to the variation in number of revolution. The generator is of such arrangement that the dimensional value of the gap $c$ between the magnetic pole surface and the armature is so determined that the total amount of the latent magnetizing power being reduced by the gap and the amount of the latent magnetizing power being consumed due to the hysteresis magnetic loss is balanced with the predetermined latent magnetizing power of the magnetic pole whereby a constant voltage is generated regardless of whether the speed of drive revolution exceeds a fixed value. It is, therefore, possible to control fully automatically the voltage without relying on an external regulating means such as an existing set of regulator and attachments thereto. Also, by remarkably lowering the coefficient of induction of the generating coils for minimizing an increase of the impedance, it is possible to reduce a generation of the surging voltage as well as to increase the generating efficiency. Incidentally, though the above requirements are applicable to a conventional multipolar-cross movement type generator, it is stressed that greater advantages are obtainable from the homopole-type generator of the present invention when the above requirements are applied thereto.

A description is made hereunder with respect to the general principle. Functional effect by the latent magnetizing power has been briefly described hereinabove. Generally, it is recognized that a magnetic circuit may be solved in accordance with Ohm's law. When the fact, that the magnetic flux density does not vary with the variation of the dimensional value of a gap positioned in series within a magnetic circuit, is applied to a case wherein the fact is solved according to Ohm's law, it may be considered that the reluctance of a magnet body corresponds to the ohmic resistance and is designated by $R_o$ and that the reluctance of a gap corresponds to the reactance resistance and is designated by $\omega L$. Considering the impedance relative to the variation of $\omega L$ and represented by $Z = \sqrt{R_o^2 + \omega^2 L^2}$, since $R_o$ is of an extremely larger value, little variation arises in the real number of the impedance and, as the value of the above $R_o$ comes closer to the value of the above $\omega L$, the variation becomes remarkable. In this case, the latent magnetizing power may be considered a similarity of the reluctance.

On the other hand, since the hysteresis magnetic loss increases in proportion to $\omega$ (angular velocity), it is understood that the variation of the value of impedance $Z$ will proceed with a course wherein the value abruptly increases to decrease the density of the magnetic flux through the gap.

The hysteresis magnetic loss is in proportion to the area of the hysteresis loop as represented by Steinmetz's experimental formula. This formula, however, expresses a loss in an electrical power and it should of course be understood that, in the case where the magneto-motive power is produced by a permanent magnet, the formula is related to a mere resisting power ($H_p$) which would act against the passage of a magnetism. Therefore, after a state represented by $R_o = \omega L + H_p$ is established, the impedance $Z$ is in proportion to the increase in the resisting power $H_p$. By appropriately selecting the value of the resisting power $H_p$, therefore, it is possible to generate a voltage of a fixed and stabilized value which is held in balance with the variation of the angular velocity. As an example, silicon steel plate core of about $30 \times H_p$ is utilized in a generator for the use for an automobile engine. In addition, counter magnetic fields are usually produced by the currents flowing through the generating coils. Since, however, a magnetic material is of a extremely reduced reversible permeability, the produced counter magnetic field is of very small value in the instant example.

The characteristic diagram, regarding the number of revolution relative to the voltage generated, of the generator according to the last described example is illustrated, as an example, in FIG. 15 by the full line Q. As it will be apparent from the illustration, the generated voltage is in proportion to the revolutions as far as the number thereof is on the line portion between the points $a$ and $b$ whereas, after the number of the revolution reaches the point $b$, the voltage is kept substantially constant regardless of the increase of the number of revolutions. Thus, the generator is suitable for use with an internal combustion engine or the like whose number of revolutions varies widely. Incidentally, the dashed line $q$ in FIG. 15, represents the character of a conventional generator.

With the homopole-type AC generator, one can obtain a single phase current of rectangular voltage wave which current may be subjected to full-wave rectification to be converted into complete direct current. The distance between the generating coils in the homopole-type AC generator may be reduced to the extent from one third to one fifth the distance in three phase type generator. Furthermore, a wire of a larger diameter is utilizable for the winding of the homopole-type AC generator, resulting in an decrease in electrical resistance to the extent from one tenth to one twentieth the resistance in a three-phase type generator and also resulting in a remarkable increase in generating efficiency. It is further pointed out that the generator is of single phase type which necessitates only four commutator elements and simplified winding to thereby serve to lower the cost.

What is claimed is:

1. A homopole-type AC generator comprising a rotary magnetic pole body having N and S poles and mounted on a rotary drive shaft so that the magnetic axis is coincident with the axis of said drive shaft, a pole piece of a split cylinder-like configuration mounted on a homopole of the N and S poles, a set of core pieces disposed in opposite relation to said pole piece with a gap extending therebetween, said set of core pieces being of split cylinder-like configuration having substantially the same length as that of said pole piece, cores mounted in a yoke and provided with said core pieces and further wound with generating coils, and a structure for constituting a magnetic path so that the magnetic flux flows from one pole of said rotary magnetic pole body, passes through said pole piece, core pieces, cores and yoke and reaches the other pole of said pole body.

2. A homopole-type AC generator as claimed in claim 1, wherein said set of core pieces consists of a pair of semicylindrical pieces disposed in opposed relationship and the generator is of single phase, single element and single pole type.

3. A homopole-type AC generator as claimed in claim 1, wherein said pole piece comprises a pair of diametrically opposed pieces each in the form of a quarter of a cylinder, said set of core pieces consists of four pieces disposed on the same circle and each formed of a quarter of a cylinder, and the generator is of single phase, single element and two pole type.

4. A homopole-type AC generator as claimed in claim 1, wherein said pole piece consists of one third a cylinder, said set of core pieces consists of three pieces disposed on the same circle and each formed of one third of a cylinder, and the generator is of three phase, single element and single pole type.

5. A homopole-type AC generator as claimed in claim 1, wherein said pole piece comprises a pair of pieces mounted on said rotary magnetic pole body each at one of the poles and such that the pieces at both poles are disposed in symmetry with respect to said rotary drive shaft, and the motor is of two element type.

6. A homopole-type AC generator as claimed in claim 1, wherein said pole piece when developed is of rectangular configuration so as to obtain a generated voltage of rectangular wave form.

7. A homopole-type AC generator as claimed in claim 1, wherein said pole piece when developed is of triangular configuration so as to obtain a generated voltage of triangular wave form.

8. A homopole-type AC generator as claimed in claim 1, wherein said pole piece when developed is of a configuration coincident with a cycle part of sine wave which part extends between two adjacent bottoms of the wave, whereby is obtained a generated voltage of modified sine wave.

9. A homopole-type AC generator as claimed in claim 1, wherein said pole piece when developed is of a configuration that on the point of a half of wave height, the upper half wave form is symmetrical to the lower half one, whereby is obtained a generated voltage of upper and lower half symmetrical wave.

10. A homopole-type AC generator as claimed in claim 1, wherein said rotary magnetic pole body is formed of a permanent magnet of large latent magnetizing power and small counter permeability, and said gap between said pole piece and said core pieces is of extremely small dimension so as to generate a voltage of a revolution vs. generated voltage characteristic having an enlarged linear range.

11. A homopole-type AC generator as claimed in claim 10, wherein said permanent magnet is Barium-ferrite permanent magnet.

12. A homopole-type AC generator as claimed in claim 1, wherein said rotary magnetic pole body is formed of a permanent magnet of predetermined latent magnetizing force and small reversible permeability, each core is formed from a material of appropriate hysteresis loss, and the dimension of said clearance between said pole piece and said core pieces is appropriately determined so that the value of a generated voltage is kept substantially constant after the revolution of the generator reaches a predetermined number.

* * * * *